United States Patent
Wu (10) Patent No.: US 11,945,383 B2
(45) Date of Patent: Apr. 2, 2024

(54) CONTROL SYSTEM FOR TRAVELLING SYSTEM

(71) Applicant: ABILITY ENTERPRISE CO., LTD., New Taipei (TW)

(72) Inventor: Cheng-Chang Wu, New Taipei (TW)

(73) Assignee: ABILITY ENTERPRISE CO., LTD., New Taipei (TW)

(*) Notice: Subject to any disclaimer, the term of this patent is extended or adjusted under 35 U.S.C. 154(b) by 277 days.

(21) Appl. No.: 17/516,450

(22) Filed: Nov. 1, 2021

(65) Prior Publication Data

US 2022/0144191 A1 May 12, 2022

Related U.S. Application Data

(60) Provisional application No. 63/111,663, filed on Nov. 10, 2020.

(30) Foreign Application Priority Data

Jun. 24, 2021 (TW) ................................. 110207311

(51) Int. Cl.
| | |
|---|---|
| *B60R 16/023* | (2006.01) |
| *B60R 16/027* | (2006.01) |
| *B62D 15/02* | (2006.01) |
| *G07C 5/02* | (2006.01) |
| *H04N 17/00* | (2006.01) |
| *H04N 23/57* | (2023.01) |
| *H04N 23/60* | (2023.01) |

(52) U.S. Cl.
CPC ........ *B60R 16/0232* (2013.01); *B62D 15/021* (2013.01); *G07C 5/02* (2013.01); *H04N 17/002* (2013.01); *H04N 23/57* (2023.01); *H04N 23/60* (2023.01); *B60R 16/027* (2013.01)

(58) Field of Classification Search
CPC . B60R 16/0232; B60R 16/027; B62D 15/021; G07C 5/02
USPC .......................................................... 340/576
See application file for complete search history.

(56) References Cited

U.S. PATENT DOCUMENTS

| | | | | |
|---|---|---|---|---|
| 11,708,079 B2 * | 7/2023 | Wieczorek | ............ | B60W 40/08 340/576 |
| 2006/0202843 A1 * | 9/2006 | Ota | ....................... | G06V 10/145 340/576 |
| 2009/0090577 A1 * | 4/2009 | Takahashi | .......... | G01N 33/4972 340/576 |
| 2015/0189241 A1 * | 7/2015 | Kim | .......................... | G06T 7/33 348/148 |
| 2016/0250968 A1 * | 9/2016 | Shirakata | .............. | B60K 28/066 340/576 |
| 2020/0193633 A1 * | 6/2020 | Sugiyama | ............ | H04N 17/002 |

* cited by examiner

*Primary Examiner* — Kam Wan Ma
(74) *Attorney, Agent, or Firm* — Innovation Counsel LLP (57) ABSTRACT

A control system of a travelling system includes a directional controller, a first sensor, a second sensor, an image-capturing module and a preprocessor. The first sensor is disposed on a reference position. The second sensor and the image-capturing module are disposed on the directional controller. The preprocessor compares a first directional data from the first sensor and a second directional data from the second sensor to obtain a difference value, and provides a photographing parameter to the image-capturing module.

20 Claims, 5 Drawing Sheets

CONTROL SYSTEM FOR TRAVELLING SYSTEM

This application claims the benefit of U.S. provisional application No. 63/111,663, filed Nov. 10, 2020, and Taiwan application Serial No. 110207311, filed Jun. 24, 2021, the subject matters of which are incorporated herein by references.

TECHNICAL FIELD

The present invention relates in general to a control system for a travelling system, and more particularly to a control system which may control a moving direction of the travelling system.

BACKGROUND

The travelling system plays an indispensable role in daily life, facilitating the connection or transportation from city to city, or even from country to country. With the frequent use of the travelling system, traveling safety has become one of the goals that the industry is striving for.

One way to preserve traveling safety is to monitor changes in the driving environment or the driver's mental state in real time, by continuously capturing continuous images of the driver, and then determining whether there is a sudden situation in the driving environment or the driver's current mental state based on the image stream of the captured continuous images. For example, whether there is a foreign object suddenly interfering with the driver, or whether the driver has not looked straight ahead for more than the expected time, or whether the driver has kept his eyes closed for more than the expected time and may be in a state of mental discomfort is determined.

However, there are some situations that may cause a failure in capturing the images, such as when the car is tilted, the road is bumpy, or the driver's arm swings to block the path for capturing the images, resulting in the need to recreate the images or to correct the images again, or even failing to estimate the driver's condition based on the images.

SUMMARY

The present invention is directed to a control system for a travelling system, which may be applied to the travelling system to improve the aforementioned defects.

According to one embodiment, a control system for a travelling system is provided. The control system includes a first sensor, a directional controller, an image-capturing module, a second sensor and a preprocessor. The first sensor is disposed on a reference position. The image-capturing module and the second sensor are disposed on the directional controller. The preprocessor compares a first directional data from the first sensor and a second directional data from the second sensor to obtain a difference value, and provides a photographing parameter to the image-capturing module.

According to another embodiment, a control system for a travelling system is provided. The control system includes a first sensor, a directional controller, a second sensor and a preprocessor. The first sensor is disposed on a reference position, and generates a first directional data in accordance with a first orientation of the reference position. The second sensor is disposed on the directional controller, and generates a second directional data in accordance with a second orientation of the directional controller. The preprocessor electrically connects to the first sensor and the second sensor, and compares a difference value between the first directional data and the second directional data.

According to still another embodiment, a control system for a travelling system is provided. The control system includes a first sensor, a rotatable directional controller, an image-capturing module, a second sensor and a preprocessor. The first sensor is disposed on a reference position for continuously providing a first directional data in accordance with the reference position. The image-capturing module is disposed on the directional controller for capturing a plurality of streaming images with a real-time updated photographing parameter. The second sensor is disposed on the directional controller, and continuously provides a second directional data in accordance with the directional controller. The preprocessor electrically connects to the first sensor and the second sensor, continuously compares a difference value in accordance with the first directional data and the second directional data, and commands the image-capturing module to renew the real-time updated photographing parameter and capture the next image.

The above and other aspects of the invention will become better understood with regard to the following detailed description of the preferred but non-limiting embodiment(s). The following description is made with reference to the accompanying drawings.

DETAILED DESCRIPTION

Embodiments of the present invention will be described in detail hereinafter, and illustrated with the accompanying drawings. For the sake of clarity, many practical details are also described hereinafter. However, it should be understood that these practical details should not be used to limit the present invention. In other words, these practical details are not necessary for some implementations of the present invention. In addition, for the sake of simplicity, some well-known structures and elements are illustrated in the drawings in a simple schematic manner. Also, unless otherwise indicated, elements with the same reference numerals in different drawings may be treated as corresponding elements. The drawings are illustrated to clearly express the connection between the elements in these implementations, rather than showing the actual size or scale of the elements.

Figure 1:
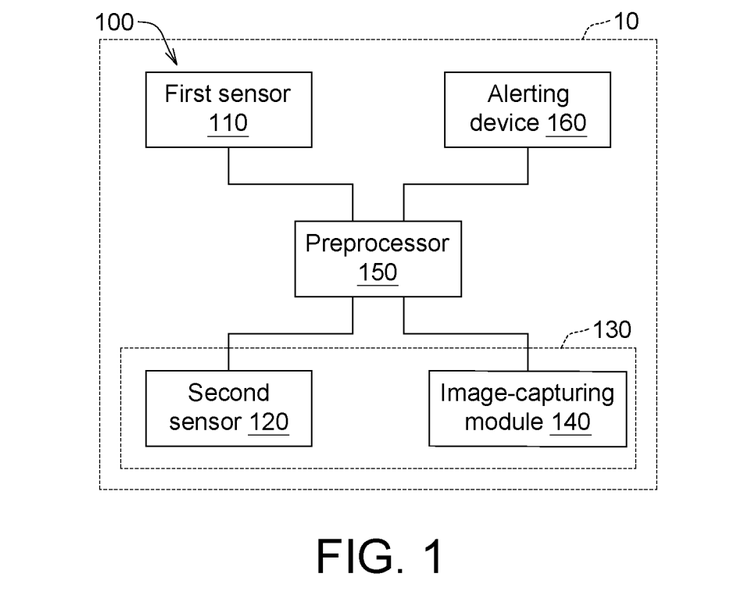
FIG. 1 shows a block diagram of a control system according to one embodiment of the present invention.

Referring to FIG. 1, a block diagram of a control system 100 according to one embodiment of the present invention is shown. The control system 100 may be applied to a travelling system 10 including but not limited to a motor-cycle, an automobile, an airplane and a marine vessel, etc.

The control system 100 at least includes a first sensor 110, a second sensor 120, a directional controller 130, an image-capturing module 140 and a preprocessor 150. The first sensor 110, the second sensor 120 and the image-capturing module 140 may electrically connect to the preprocessor 150, respectively. In one specific embodiment, the first sensor 110 and the second sensor 120 may be any one of an angular position sensor, an angular velocity sensor, an angular acceleration sensor, a displacement sensor, a velocity sensor and an acceleration sensor, respectively. In another specific embodiment, the first sensor 110 and/or the second sensor 120 may be a gravitational sensor, which senses the orientation of gravity in response to changes in gravity.

In the following embodiments, the travelling system 10 is exemplified as being an automobile, the first sensor 110 and the second sensor 120 are exemplified as being gravitational sensors, but it should be understood that the travelling system 10 the control system 100 may be applied to is not only limited to automobile, and the first sensor 110 and the second sensor 120 are not only limited to the gravitational sensors.

Figure 2:
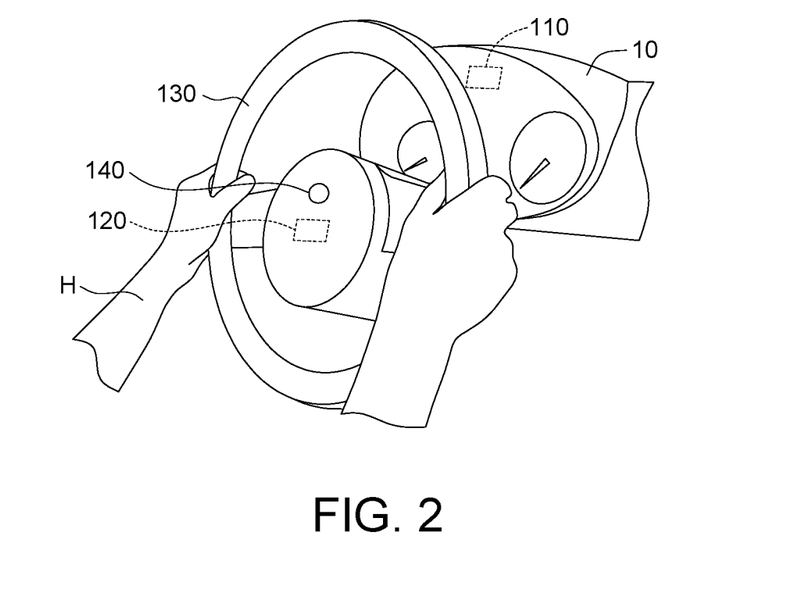
FIG. 2 shows a schematic diagram of the directional controller, the first sensor, the second sensor and the image-capturing module according to one embodiment of the present invention.

FIG. 2 shows a schematic diagram of the directional controller 130, the first sensor 110, the second sensor 120 and the image-capturing module 140 according to one embodiment of the present invention.

Referring to FIG. 1 and FIG. 2, the first sensor 110 may be disposed on a reference position, and the reference position does not move with the mechanical rotation of the directional controller 130 to change its angle or direction. That is, the reference position is irrelevant to the rotation angle of the directional controller 130. Therefore, the first sensor 110 in the reference position does not move with the rotation of the directional controller 130 either, and the first sensor 110 may detect a first directional data regarding the reference position in a first orientation, i.e., the first directional data regarding the first orientation where the travelling system 10 is located. For example, the reference position is any position other than the directional controller 130, such as but not limited to the console, instrument panel, audio/video device within the travelling system 10, or any position on the body of the automobile. In one specific embodiment, the first sensor 110 is a gravitational sensor, which may obtain the first directional data regarding the first orientation where the travelling system 10 is located at the moment in accordance with the current direction of the gravitational acceleration. The first sensor 110 may also be a sensor designed based on the principle of an angular velocity sensor, an angular acceleration sensor and/or an acceleration sensor, and the present invention is not limited thereto.

The directional controller 130 may be disposed in the travelling system 10 and may rotate relative to the travelling system 10, thereby changing the moving direction of the travelling system 10.

The second sensor 120 and the image-capturing module 140 are disposed on the directional controller 130. When the directional controller 130 rotates relative to the travelling system 10, the second sensor 120 and the image-capturing module 140 also rotate synchronously with the directional controller 130 relative to the travelling system 10, and the second sensor 120 may synchronously detect a second directional data regarding a second orientation where the directional controller 130 is located at the moment. In addition, the reference position moves with the travelling system 10 but does not move with the directional controller 130. Therefore, the first directional data provided by the first sensor 110 disposed on the reference position and the second directional data provided by the second sensor 120 are irreverent and independent from each other. In one specific embodiment, the second sensor 120 is a gravitational sensor, which may obtain the second directional data regarding the second orientation where the directional controller 130 is located at the moment in accordance with the current direction of the gravitational acceleration. The second sensor 120 may also be a sensor designed based on the principle of an angular velocity sensor, an angular acceleration sensor and/or an acceleration sensor, and the present invention is not limited thereto.

Specifically, the second directional data includes a rotation angle ω (indicated in FIG. 5) of the directional controller 130 and the first directional data regarding the travelling system 10. If the directional controller 130 itself does not rotate, the directional controller 130 and the travelling system 10 have the same orientation, and the first directional data from the first sensor 110 is identical with the second directional data from the second sensor 120.

The image-capturing module 140 may captures images in the direction towards the driver's seat, including capturing the image of the upper body of the driver H and/or the image of the interior of the travelling system. During travel of the travelling system 10, the image-capturing module 140 may capture a single image, or continuously capture continuous images, and transmit the single image or a video streaming data with streaming images to the preprocessor 150. The image-capturing module 140 at least includes an optical lens (not illustrated) and an image sensor 142 (indicated in FIG. 3A and FIG. 3B). The optical lens has a field of view (FOV), and the angle of the FOV may be greater than 90° or between 90° and 220°. The image sensor 142 may be, for example, a charge coupled device (CCD), a complementary metal-oxide semiconductor (CMOS) device.

The preprocessor 150 may receive the first directional data from the first sensor 110, the second directional data from the second sensor 120 and the image from the image-capturing module 140, and may compare the first directional data and the second directional data to obtain a difference value between the first directional data and the second directional data. Thus, the preprocessor 150 may provide the image-capturing module 140 with a photographing parameter in accordance with the difference value, so that the image-capturing module 140 may capture the next image in accordance with the photographing parameter.

Accordingly, in one embodiment of capturing the streaming images the first sensor 110 and the second sensor 120 continuously provide the current first directional data and the current second directional data to the preprocessor 150 respectively, and the preprocessor 150 continuously compares the difference value in accordance with the first directional data and the second directional data, and updates the photographing parameter of the image-capturing module 140 in real time in accordance with the latest difference value, so that the image-capturing module 140 may capture the next image in accordance with the final photographing parameter. With the first sensor 110, the second sensor 120, the image-capturing module 140 and the preprocessor 150 interworking at their respective frequencies, the streaming images may be captured by the image-capturing module 140 with real-time updated photographing parameter.

Figure 3A:
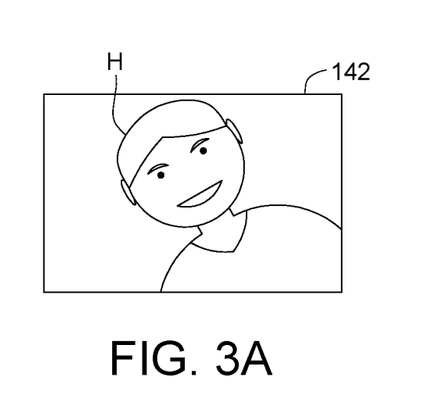
FIG. 3A shows a schematic diagram of a first image captured by the image-capturing module.
Figure 3B:
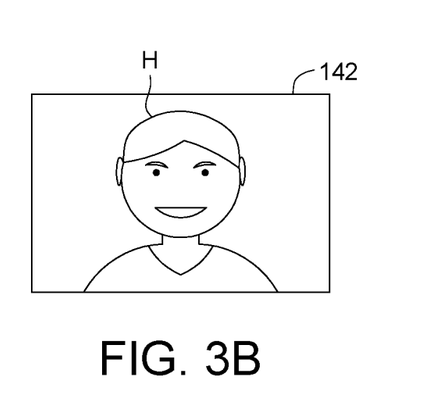
FIG. 3B shows a schematic diagram of a second image captured by the image-capturing module.
Figure 4A:
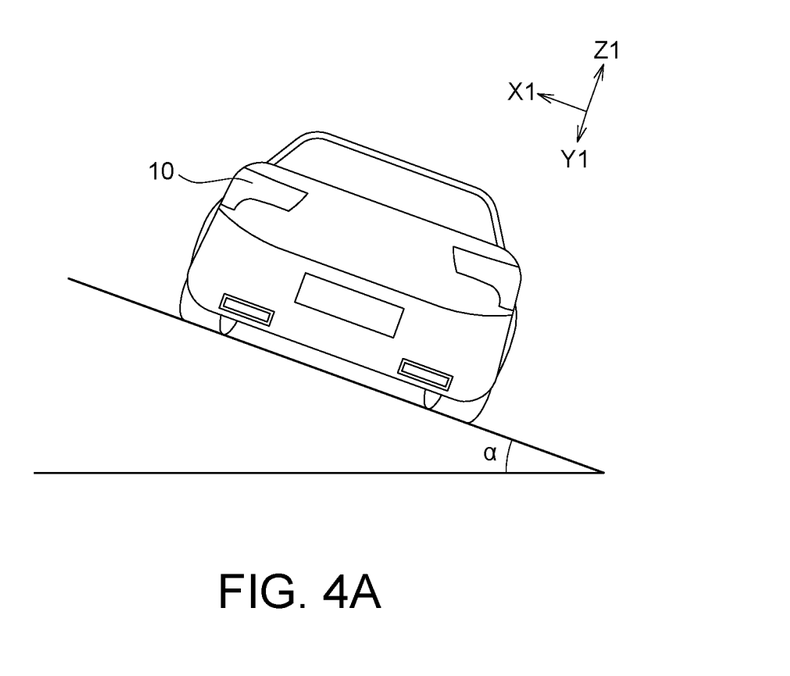
FIG. 4A shows the travelling system in a tilt state according to one embodiment.
Figure 4B:
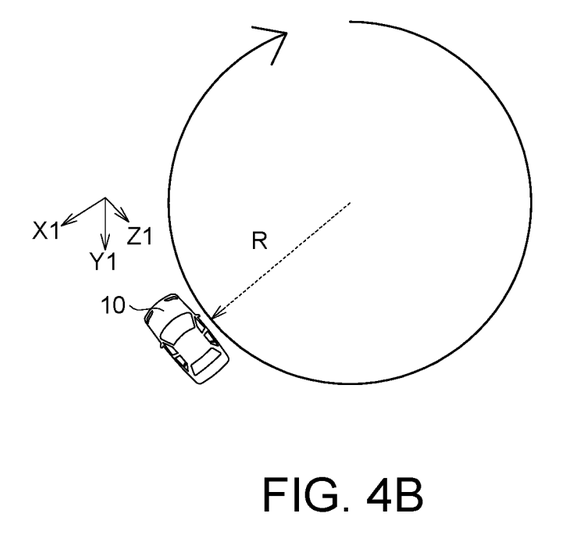
FIG. 4B shows the travelling system in a tilt state according to another embodiment.
Figure 5:
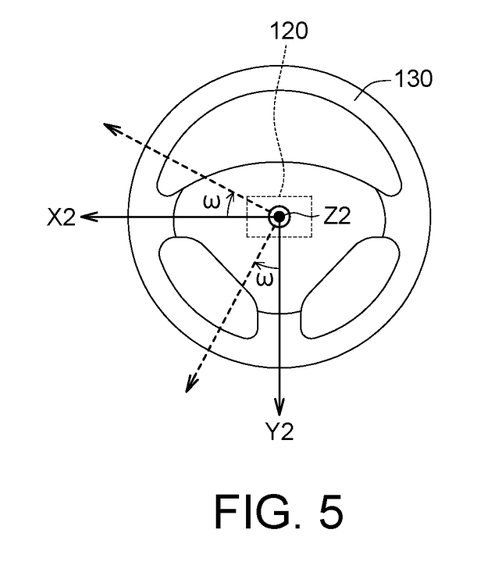
FIG. 5 shows a schematic diagram of the directional controller.

FIG. 3A shows a schematic diagram of a first image captured by the image-capturing module 140. FIG. 3B shows a schematic diagram of a second image captured by the image-capturing module 140. FIG. 4A shows the travelling system 10 in a tilt state according to one embodiment. FIG. 4B shows the travelling system 10 in a tilt state according to another embodiment. FIG. 5 shows a schematic diagram of the directional controller 130.

Referring to FIG. 1, FIG. 2 and FIG. 3A, in one embodiment, the image-capturing module 140 captures a first image in accordance with a predefined photographing parameter. In other words, the image-capturing module 140 captures the first image without having a real-time updated photographing parameter at this time. That is, there may be an angle deviation between the driver H in the first image and the image sensor 142, and the image-capturing module 140 may transmit the first image of the driver H with the angle deviation to the preprocessor 150.

Next, referring to FIG. 1, FIG. 2 and FIG. 3B, the preprocessor 150 compares the first directional data of the first sensor 110 and the second directional data of the second sensor 120, obtains the difference value between the first directional data and the second directional data and the photographing parameter, and commands the image-capturing module 140 to capture the subsequent second image in accordance with the photographing parameter, so that the angle deviation of the subsequent second image may be substantially compensated.

Referring to FIG. 1, FIG. 2 and FIG. 4A, in one specific embodiment, since the travelling system 10 may jerk at an angle of a degrees during travel or may travel on a road surface that is inclined at an angle of a degrees, there is a tilt angle of a degrees between the left and right sides of the travelling system 10 and the horizontal plane, and there is a tilt angle of substantially a degrees between the travelling system 10 and the horizontal plane. During the travel, the directional controller 130 remains unrotated, i.e., the rotation angle (w) of the directional controller 130 is zero. Furthermore, since both of the driver H and the image-capturing module 140 are located in the travelling system 10 and shake synchronously with the travelling system 10, there is a tilt angle of a degrees between both of the driver H and the image-capturing module 140 and the horizontal plane, so that there is basically no angle deviation between the driver H and the image-capturing module 140.

Referring to FIG. 1, FIG. 2, FIG. 4B and FIG. 5, in another embodiment, if the travelling system 10 travels when the directional controller 130 rotates clockwise by an angle, that is, the travelling system 10 travels on the horizontal plane in the direction with a radius of curvature R and the rotation angle of the directional controller 130 ω≠0, the travelling system 10 may tilt relative to the horizontal plane due to the centrifugal force.

Referring to FIG. 4A, FIG. 4B and FIG. 5, in one specific embodiment, the first sensor 110 is a gravitational sensor, the coordinate system defined by the X1 axis, the Y1 axis and the Z1 axis is the gravity coordinate system of the first sensor 110, and the X1 axis, the Y1 axis and Z1 axis may be perpendicular to each other. In another specific embodiment, the second sensor 120 is a gravitational sensor, the coordinate system defined by the X2 axis, the Y2 axis and the Z2 axis is the gravity coordinate system of the second sensor 120, and the X2 axis, the Y2 axis and Z2 axis may be perpendicular to each other. In the following description, both of the first sensor 110 and the second sensor 120 are exemplified as being gravitational sensors, and the Z1 axis and Z2 axis are substantially in the same direction, but the present invention is not limited thereto.

Referring to FIG. 1, FIG. 2, FIG. 4A and FIG. 5, the first sensor 110 may obtain the current orientation of gravity in accordance with the components generated on the X1 axis, the Y1 axis and Z1 axis by the gravitational acceleration, thereby acquiring the orientation of the travelling system 10. That is, the tilt angle α of the travelling system 10 relative to the horizontally plane may be obtained. The second sensor 120 may obtain the current orientation of gravity in accordance with the components generated on the X2 axis, the Y2 axis and Z2 axis by the gravitational acceleration, thereby acquiring the orientation of the directional controller 130. That is, the sum of the rotation angle ω of the directional controller 130 and the tilt angle α of the travelling system 10 may be obtained. The directional controller 130 may rotate in the plane of X2 and Y2 axes with Z2 axis as the axis of rotation. When the rotation angle (w) of the directional controller 130 is zero, that is, when the directional controller 130 does not rotate, the X1 axis may be substantially identical with the X2 axis, and the Y1 axis may be substantially identical with the Y2 axis.

Figure 6:
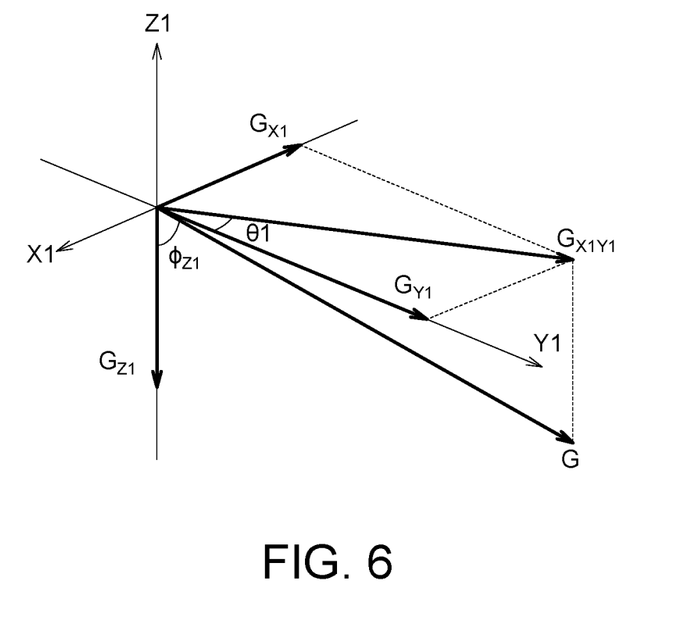
FIG. 6 shows a first gravity coordinate system of the first sensor.

FIG. 6 shows a first gravity coordinate system of the first sensor 110.

Referring to FIG. 1, FIG. 2, FIG. 4A and FIG. 6, during travel of the travelling system 10, the first sensor 110 may detect a first component $G_{X1}$ generated on an X1 axis, a second component $G_{Y1}$ generated on a Y1 axis and a third component $G_{Z1}$ generated on a Z1 axis by the gravitational acceleration G in accordance with the orientation of the travelling system 10 (the extent that the travelling system 10 tilts), thereby generating the first directional data. After receiving the first directional data, the preprocessor 150 may calculate a first angle $\phi_{Z1}$ relative to the Z1 axis in accordance with the third component $G_{Z1}$ generated on the Z1 axis by the gravitational acceleration G. The first angle $\phi_{Z1}$ may obtained by the following (equation I):

$$\phi_{Z1}=\cos^{-1}(G_{Z1}/G) \quad \text{(equation I)}$$

Next, the preprocessor 150 may calculate a first inclined angle θ1 relative to the Y1 axis in accordance with the gravitational acceleration G, the first angle $\phi_{Z1}$ and the second component $G_{Y1}$ generated on the Y1 axis by the gravitational acceleration G. The first inclined angle θ1 may obtained by the following (equation II) and (equation III):

$$\theta1=\cos^{-1}(G_{Y1}/G_{X1Y1}) \quad \text{(equation II)}$$

$$G_{X1Y1}=G\sin\phi_{Z1} \quad \text{(equation III)}$$

Figure 7:
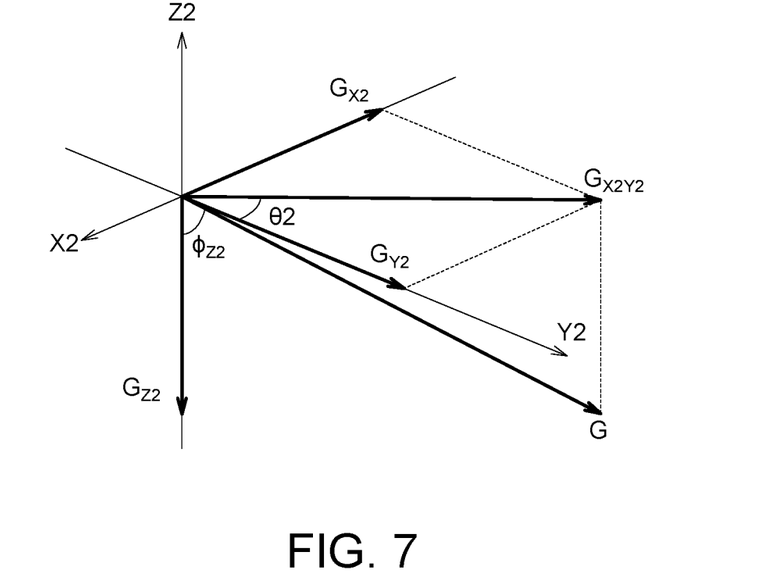
FIG. 7 shows a second gravity coordinate system of the second sensor.

FIG. 7 shows a second gravity coordinate system of the second sensor 120.

Also referring to FIG. 7 at the same time, the second sensor 120 may detect a fourth component $G_{X2}$ generated on an X2 axis, a fifth component $G_{Y2}$ generated on a Y2 axis and a sixth component $G_{Z2}$ generated on a Z2 axis by the gravitational acceleration G in accordance with the orientation of the directional controller 130 (the extent that the directional controller 130 rotates), thereby generating the second directional data. After receiving the second directional data, the preprocessor 150 may calculate a second angle $\phi_{Z2}$ relative to the Z2 axis in accordance with the sixth component $G_{Z2}$ generated on the Z2 axis by the gravitational acceleration G. The second angle $\phi_{Z2}$ may obtained by the following (equation IV):

$$\phi_{Z2}=\cos^{-1}(G_{Z2}/G) \quad \text{(equation IV)}$$

Next, the preprocessor 150 may calculate a second inclined angle 82 relative to the Y2 axis in accordance with the gravitational acceleration G, the second angle $\phi_{Z2}$ and fifth the component $G_{Y2}$ generated on the Y2 axis by the gravitational acceleration G. The second inclined angle θ2 may obtained by the following (equation V) and (equation VI):

$$\theta 2 = \cos^{-1}(G_{Y2}/G_{X2Y2}) \quad \text{(equation V)}$$

$$G_{X2Y2} = G \sin \phi_{Z2} \quad \text{(equation VI)}$$

Accordingly, the preprocessor 150 may obtain the first inclined angle θ1 and the second inclined angle θ2 in accordance with the first directional data from the first sensor 110 and the second directional data from the second sensor 120. After that, the preprocessor 150 may further obtain the difference value in accordance with the first inclined angle θ1 and the second inclined angle θ2.

For example, in the situation as shown in FIG. 4A, since the directional controller 130 does not rotate, the orientation of the directional controller 130 detected by the second sensor 120 may be substantially identical with the orientation of the travelling system 10. Thus, the first inclined angle θ1 obtained from (equation I) to (equation III) is substantially identical with the second inclined angle θ2 obtained from (equation IV) to (equation VI). After comparing the first directional data from the first sensor 110 and the second directional data from the second sensor 120, the preprocessor 150 determines that the travelling system 10 is in a tilt state relative to the horizontal plane at present, and the driver also tilts with the travelling system 10 in accordance with the first inclined angle θ1 of the first directional data. Since the second inclined angle θ2 is substantially identical with the first inclined angle θ1, the preprocessor 150 may determine that the directional controller 130 itself does not rotate, but only tilts with the travelling system 10. Therefore, there is basically no difference value between the first inclined angle θ1 and the second inclined angle θ2 calculated by the preprocessor 150 (the difference value is equal to zero), and the photographing parameter is not required to be adjusted, so that the image-capturing module 140 may capture the correctly captured image as shown in FIG. 3B.

In the situation as shown in FIG. 4B, since the rotation angle of the directional controller 130 is ω, the orientation of the directional controller 130 detected by the second sensor 120 may include the rotation angle ω of the directional controller 130 and the orientation of the travelling system 10. Thus, the first inclined angle θ1 obtained from (equation I) to (equation III) is not identical with the second inclined angle θ2 obtained from (equation IV) to (equation VI). After comparing the first directional data from the first sensor 110 and the second directional data from the second sensor 120, the preprocessor 150 determines that the travelling system 10 is in a tilt state relative to the horizontal plane at present (due to centrifugal force), and the driver also tilts with the travelling system 10 in accordance with the first inclined angle θ1 of the first directional data. Since the second inclined angle θ2 is not identical with the first inclined angle θ1, the preprocessor 150 may determine that the directional controller 130 not only tilts with the travelling system 10, but also rotates. Therefore, the difference value between the first inclined angle θ1 and the second inclined angle θ2 calculated by the preprocessor 150 is the rotation angle ω of the directional controller 130, and the photographing parameter is adjusted accordingly, for example, the angle of the field of view of the image sensor 142 is adjusted, so that the image-capturing module 140 may capture the correctly captured image as shown in FIG. 3B, or rotate the image of the image sensor 142.

In other embodiment, the preprocessor 150 may further determine, according to the rotation angle of the directional controller 130, whether the image-capturing module 140 captures a horizontal image, a vertical image, or captures image in a mode that compensates for the rotation angle of the directional controller 130. For example, the image-capturing module 140 captures a horizontal image by default according to an initial photographing parameter. If the rotation angle of the directional controller 130 exceeds a predefined angle, the preprocessor 150 may provide an updated photographing parameter to the image-capturing module 140 and command the image-capturing module 140 to capture a vertical image according to the updated photographing parameter, or may update the photographing parameter and command the image-capturing module 140 to capture image by an angle inverse to the rotation angle of the direction controller 130.

In the present invention, since the second sensor 120 uses the same gravity coordinate system as the first sensor 110, by knowing whether the directional controller 130 itself rotates or not, the change in angle between the image-capturing module 140 that moves with the directional controller 130 and the driver may be known, and the preprocessor 150 may update the photographing parameter in real time so as to command the image-capturing module 140 to capture the streaming images.

Furthermore, in another embodiment of the present invention, the control system 10 may further include an alerting device 160. As shown in FIG. 1, the alerting device 160 electrically connects to the preprocessor 150. When the image-capturing module 140 captures the streaming images in accordance with the real-time updated photographing parameter and provides the streaming images to the preprocessor 150, the preprocessor 150 may compare the streaming images, and command the alerting device 160 to issue a warning information in accordance with an abnormal result, for example but not limited to sound, light or vibration alarm. For example, if the preprocessor 150 determines that the driver has kept his eyes closed for more than the expected time after comparing the streaming images, the preprocessor 150 may command the alerting device 160 to issue a warning information, so as to warn that the driver should pay attention to the immediate traffic information to avoid a possible car accident.

It will be apparent to those skilled in the art that various modifications and variations can be made to the disclosed embodiments. It is intended that the specification and examples be considered as exemplary only, with a true scope of the present invention being indicated by the following claims and their equivalents.

What is claimed is:

1. A control system for a travelling system comprising:
    a first sensor disposing on a reference position;
    a directional controller;
    an image-capturing module disposing on the directional controller;
    a second sensor disposing on the directional controller; and
    a preprocessor comparing a first directional data from the first sensor and a second directional data from the second sensor to obtain a difference value, and providing a photographing parameter to the image-capturing module in accordance with the difference value.

2. The control system according to claim 1, wherein the image-capturing module captures a vertical image, a horizontal image or an image by an angle inverse to a rotation angle of the directional controller in accordance with the photographing parameter.

3. The control system according to claim 2, further comprising an alerting device electrically connecting to the preprocessor, the preprocessor compares a plurality of streaming images captured by the image-capturing module, and the alerting device issues a warning information while detecting an abnormal result.

4. The control system according to claim 1, wherein the difference value is a rotation angle of the directional controller.

5. The control system according to claim 1, wherein the first sensor and/or the second sensor are/is any one of an angular position sensor, an angular velocity sensor, an angular acceleration sensor, a displacement sensor, a velocity sensor, an acceleration sensor and a gravitational sensor, respectively.

6. The control system according to claim 1, wherein the first sensor and the second sensor are gravitational sensors, the first directional data has a first component on an X1 axis, a second component on a Y1 axis and a third component on a Z1 axis; the second directional data has a fourth component on an X2 axis, a fifth component on a Y2 axis and a sixth component on a Z2 axis; the preprocessor calculates a first angle relative to the Z1 axis in accordance with a gravitational acceleration and the third component, and calculates a first inclined angle relative to the Y1 axis in accordance with the gravitational acceleration, the first angle and the second component; and the preprocessor calculates a second angle relative to the Z2 axis in accordance with the gravitational acceleration and the sixth component, calculates a second inclined angle relative to the Y2 axis in accordance with the gravitational acceleration, the second angle and the fifth component, and obtains the difference value based on difference between the first inclined angle and the second inclined angle.

7. A control system for a travelling system comprising:
a first sensor disposing on a reference position and generating a first directional data in accordance with a first orientation of the reference position;
a directional controller;
an image-capturing module disposing on the directional controller;
a second sensor disposing on the directional controller and generating a second directional data in accordance with a second orientation of the directional controller; and
a preprocessor electrically connecting to the first sensor and the second sensor, comparing a difference value between the first directional data and the second directional data, and providing a photographing parameter to the image-capturing module in accordance with the difference value.

8. The control system according to claim 7, wherein the difference value is a rotation angle of the directional controller.

9. The control system according to claim 7, wherein the first sensor and/or the second sensor are/is any one of an angular position sensor, an angular velocity sensor, an angular acceleration sensor, a displacement sensor, a velocity sensor, an acceleration sensor and a gravitational sensor, respectively.

10. The control system according to claim 7, wherein the first sensor and the second sensor are gravitational sensors, the first directional data has a first component on an X1 axis, a second component on a Y1 axis and a third component on a Z1 axis; the second directional data has a fourth component on an X2 axis, a fifth component on a Y2 axis and a sixth component on a Z2 axis; the preprocessor calculates a first angle relative to the Z1 axis in accordance with a gravitational acceleration and the third component, and calculates a first inclined angle relative to the Y1 axis in accordance with the gravitational acceleration, the first angle and the second component; and the preprocessor calculates a second angle relative to the Z2 axis in accordance with the gravitational acceleration and the sixth component, calculates a second inclined angle relative to the Y2 axis in accordance with the gravitational acceleration, the second angle and the fifth component, and obtains the difference value based on difference between the first inclined angle and the second inclined angle.

11. The control system according to claim 7, wherein the image-capturing module captures an image in accordance with the photographing parameter.

12. The control system according to claim 11, further comprising an alerting device electrically connecting to the preprocessor, wherein the preprocessor compares a plurality of streaming images captured by the image-capturing module, and the alerting device issues a warning information while detecting an abnormal result.

13. A control system for a travelling system comprising:
a first sensor disposing on a reference position for continuously providing a first directional data in accordance with the reference position;
a rotatable directional controller;
an image-capturing module disposing on the rotatable directional controller for capturing a plurality of streaming images with a real-time updated photographing parameter;
a second sensor disposing on the rotatable directional controller and continuously providing a second directional data in accordance with the rotatable directional controller; and
a preprocessor electrically connecting to the first sensor and the second sensor, continuously comparing the first directional data and the second directional data to obtain a difference value, and commanding the image-capturing module to renew the real-time updated photographing parameter in accordance with the difference value and capture the next image.

14. The control system according to claim 13, wherein the image-capturing module captures a vertical image, a horizontal image or an image by an angle inverse to a rotation angle of the directional controller in accordance with the real-time updated photographing parameter.

15. The control system according to claim 13, wherein the difference value is a rotation angle of the directional controller.

16. The control system according to claim 15, wherein the reference position is irrelevant to the rotation angle of the directional controller.

17. The control system according to claim 13, wherein the first sensor and/or the second sensor are/is any one of an angular position sensor, an angular velocity sensor, an angular acceleration sensor, a displacement sensor, a velocity sensor, an acceleration sensor and a gravitational sensor, respectively.

18. The control system according to claim 13, wherein the first sensor and the second sensor are gravitational sensors.

19. The control system according to claim 18, wherein first directional data has a first component on an X1 axis, a second component on a Y1 axis and a third component on a Z1 axis; the second directional data has a fourth component on an X2 axis, a fifth component on a Y2 axis and a sixth component on a Z2 axis; the preprocessor calculates a first angle relative to the Z1 axis in accordance with a gravitational acceleration and the third component, and calculates a first inclined angle relative to the Y1 axis in accordance with the gravitational acceleration, the first angle and the second component; and the preprocessor calculates a second angle relative to the Z2 axis in accordance with the gravitational acceleration and the sixth component, calculates a second inclined angle relative to the Y2 axis in accordance with the gravitational acceleration, the second angle and the fifth component, and obtains the difference value based on difference between the first inclined angle and the second inclined angle.

20. The control system according to claim 13, further comprising an alerting device electrically connecting to the preprocessor, wherein the preprocessor compares a plurality of streaming images, and the alerting device issues a warning information while detecting an abnormal result.

\* \* \* \* \*